United States Patent [19]

Riedinger

[11] 4,317,326
[45] Mar. 2, 1982

[54] ARTICULATED COMBINE

[75] Inventor: Franz W. Riedinger, Einöd, Fed. Rep. of Germany

[73] Assignee: Deere & Company, Moline, Ill.

[21] Appl. No.: 20,863

[22] Filed: Mar. 15, 1979

[51] Int. Cl.³ .............................................. A01F 12/18
[52] U.S. Cl. .................................... 56/14.6; 130/27 T
[58] Field of Search .............. 56/14.6, 344; 130/27 R, 130/27 T

[56] References Cited

U.S. PATENT DOCUMENTS

| | | | |
|---|---|---|---|
| 2,212,465 | 8/1940 | Baldwin | 56/14.6 |
| 3,296,782 | 1/1967 | Mark et al. | 56/14.6 |
| 3,828,535 | 8/1974 | Lundahl | 56/344 |
| 3,907,139 | 9/1975 | Luscombe | 56/344 |
| 3,995,569 | 12/1976 | Picardat | 111/12 |
| 4,136,704 | 1/1979 | Dyke | 130/27 T |

OTHER PUBLICATIONS

Champion Products, Inc., Champion Forage Harvesters.

Primary Examiner—Jay N. Eskovitz

[57] ABSTRACT

An articulated self-propelled combine has front and rear units pivotally connected together for articulation about a vertical axis, the front and rear units being respectively supported on front and rear pairs of wheels. A harvesting header is carried by the front unit and feeds a fore and aft rotary separator, the combine engine and operator's station being mounted on the front unit on opposite sides of the separator. The separated grain is transferred across the axis of articulation to a cleaning mechanism on the rear unit, the cleaned grain being conveyed to a large grain tank disposed above the cleaning unit and spanning the width and length of the rear unit. The rear unit is also capable of oscillating relative to the front unit about a fore and aft axis, self-levelling means being provided for the rear wheels to maintain the cleaner is a generally level condition.

25 Claims, 11 Drawing Figures

ARTICULATED COMBINE

BACKGROUND OF THE INVENTION

This invention relates to a self-propelled combine and more particularly to a new overall design and arrangements of components for such a combine.

A conventional modern self-propelled combine includes a rigid main frame mounted on a pair of transversely spaced forward drive wheels and steerable rear wheels. A forward transversely elongated header conventionally removes crop material from the field as the machine advances and the crop material is fed rearwardly through a feederhouse to a threshing and separating mechanism mounted in the main combine frame or body. A cleaning mechanism is conventionally disposed below the separating mechanism and the cleaned grain is delivered to an elevated grain tank that is normally located above the threshing and separating mechanisms. Such combines conventionally have an elevated operator's station, and in most cases an elevated engine. Thus, a typical combine is somewhat top heavy, particularly when the grain tank is loaded, the overall height of the combine also being a disadvantage when storing or shipping the machine.

Combine sizes and capacities have increased dramatically in recent years, and with the increase in capacity, there has been an attendant increase in the size or width of the harvesting header, so that a modern combine is capable of harvesting a relatively wide swath of material as the machine advances. However, because of the design and arrangement of components on current combines, the size of the grain tank has been limited. For example, even among the highest capacity machines currently on the market, a 200-bushel grain tank, even with extensions to increase the capacity of the tank, is considered a large tank, and when a combine is operating in high yielding crops, such as corn that can produce 200 bushels of corn per acre, the combine must have its grain tank unloaded at frequent intervals, delaying the harvesting process. In many cases, the combine grain tank is unloaded into a large truck, such as a semi-trailer, which normally is not driven into the field but is rather parked at the end of the rows, and, particularly in larger fields, it has been found that at times the grain tank capacities are insufficient for the combine to travel the length of the field and back again to the parked truck before the grain tank has had to be unloaded.

Another problem with conventional combine design has been the sensitivity to slopes, the separating and cleaning mechanism being overloaded on the downhill side when operating in a sloping field. Of course, the recently introduced rotary or axial flow combines have reduced the slope sensitivity for the separating mechanism, but the problems with the cleaners have remained when operating on side hills. On severe slopes, the problem has been overcome by providing hillside combines at significantly increased cost for a given combine capacity, and there is also currently available a sidehill combine that is capable of maintaining a level stance on more moderate side hill slopes, with a somewhat smaller cost penalty than the typical hillside combine.

SUMMARY OF THE INVENTION

According to the present invention, there is provided a novel overall design or arrangement of components for a self-propelled combine, wherein the center of gravity of the machine is substantially lowered, the overall height of the machine is reduced and the size of the grain tank is increased compared to machines of the same size and capacity of more conventional design. More specifically, the machine utilizes an articulated frame construction, wherein some of the combine components are located on a front unit of the combine while others are located on the rear unit, the two units being hinged together for articulation about a vertical axis with each of the units being supported on a pair of wheels, the combine being steered by swinging one unit relative to the other.

Of course, articulated machines are not new per se. In recent years, there has been a large number of new tractor designs utilizing the articulated concept, particularly in the larger four-wheel drive tractors. The articulated concept has also appeared in a few other agricultural machines. For example, U.S. Pat. No. 3,995,569 discloses an articulated machine having an operator's station and a fertilizer hopper on the front unit and a tillage tool and an engine on the rear unit. The concept has also been utilized in a large self-propelled forage harvester, wherein the forage harvester cutterhead, engine, and operator's station are all mounted on the front unit with a large hopper for receiving the chopped crop material mounted on the rear unit.

An important feature of the invention resides in the provision for oscillation of the rear unit relative to the front unit about a fore and aft axis so that all four wheels maintain good contact with the ground even in very irregular terrain. Another feature of the invention resides in the provision of means for levelling the rear unit of the combine while the front unit follows the contour of the ground. Further, the cleaning mechanism is mounted on the self-levelling rear unit, so that its performance will not be affected by operation of the machine on side hills. Also, the threshing and separating mechanism is of the rotary, axial flow design, so that it is not sensitive to operation on side hills, the separating and threshing mechanism being mounted on the front unit which tilts to follow the contour of the ground.

Still another feature of the invention resides in the provision of a large grain tank on the rear unit of the combine, the grain tank spanning the width of the combine and substantially spanning the force and aft length of the rear unit to provide a large grain tank size with a relatively low center of gravity, only the cleaning mechanism being disposed below the grain tank.

Another feature of the invention resides in the provision of novel means for transferring the separated grain across the pivot axis of the combine to the cleaning mechanism on the rear unit of the combine.

Still another feature resides in the provision of the operator's station and engine on opposite sides of the rotary separating unit so that the front unit of the combine also has a relatively low center of gravity.

The provision for oscillation of the rear unit relative to the front unit about a fore and aft axis requires a hinge or pivot design between the front and rear units that accommodates said oscillation. Accordingly, the pivot is formed by upper and lower pivots with the oscillation about the fore and aft axis being provided in the lower pivot while the upper pivot includes a link that accommodates the lateral swaying of the upper portions of the rear unit relative the front unit. Of course, if only a single link is used in the upper pivot, when the upper portion of the rear unit sways or shifts laterally relative to the upper portion of the front unit, the distance between the upper portions of the front and rear units decreases, causing a slight buckling of the combine at the pivot point. According to another feature of the invention, a linkage is provided between the upper portions of the front and rear units that will accommodate the relative movement of the units about the fore and aft axis of oscillation without affecting the distance between the upper portions of the front and rear units, thereby eliminating any buckling between the units.

DESCRIPTION OF THE PREFERRED EMBODIMENT

Figure 5:
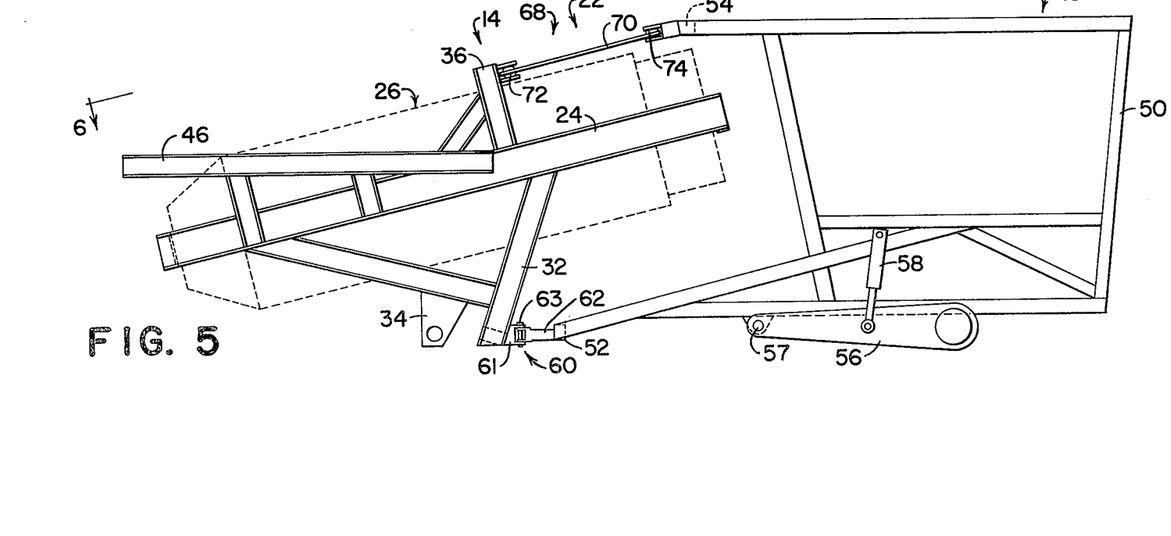
FIG. 5 is a side elevation view of the combine frame showing the major frame elements with the rotary separator shown in dotted lines.
Figure 6:
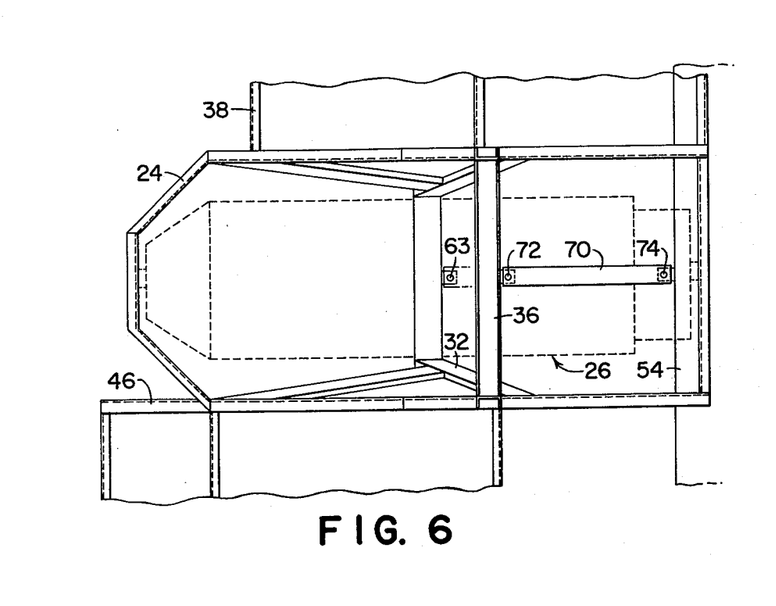
FIG. 6 is a plan view of the front frame structure viewed generally along the line 6—6 of FIG. 5.

The invention is embodied in a self-propelled articulated combine having pivotally connected front and rear units 10 and 12 that swing relative to one another about a vertical axis to effect steering of the combine. As best seen in FIGS. 5 and 6, the front unit 10 includes a front frame structure indicated in its entirety by the numeral 14, while the rear unit 12 includes a rear frame structure indicated in its entirety by the numeral 16. The front frame structure is mounted on a pair of laterally spaced forward drive wheels 18 while the rear frame structure is supported on a pair of laterally spaced rear wheels 20 that track the front wheels. The front and rear frame structures 14 and 16 are connected by a vertical pivot means, indicated generally by the numeral 22.

The front frame structure 14 includes a generally horizontal, slightly upwardly and rearwardly inclined separator support 24 that supports an axial flow rotary threshing and separating mechanism or separator 26, only the outline of which is schematically illustrated in the drawings. As is well known such separators include a generally cylindrical casing and a rotor that is coaxially disposed within the casing, crop material being introduced to the forward end of the separator and moving in a spiral path between the rotor and casing, the casing being at least partially formed by grates that permit the radial exit of threshed and separated grain while the straw or the like is ejected rearwardly from the separator after the grain has been separated from the straw. An axial flow separating and threshing mechanism or separator of the above general type is shown in copending U.S. application Ser. No. 889,626, also assigned to the assignee herein.

Figure 1:
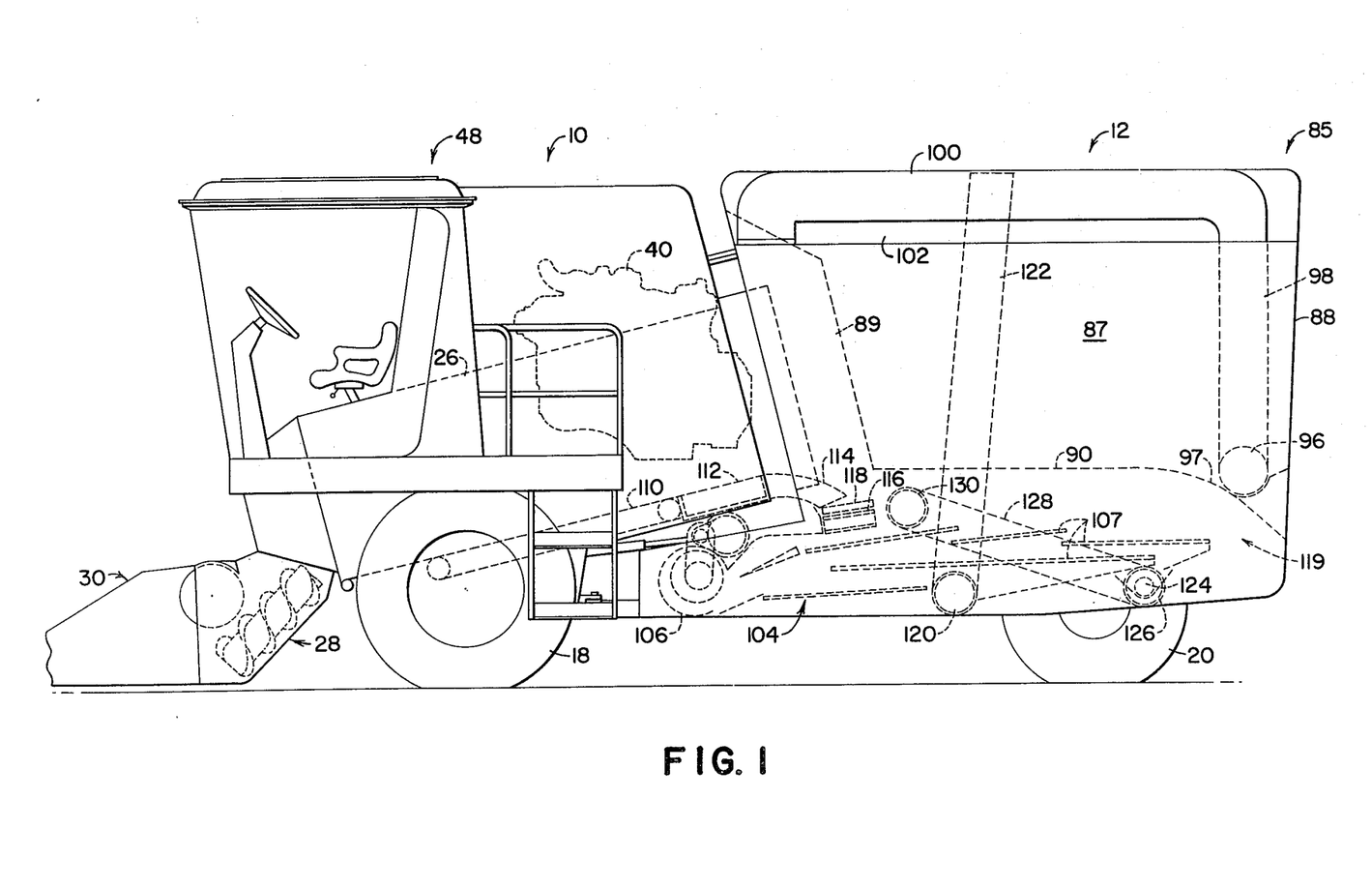
FIG. 1 is a side elevation view of the articulated combine embodying the invention with some of the combine components schematically illustrated in dotted lines.
Figure 2:
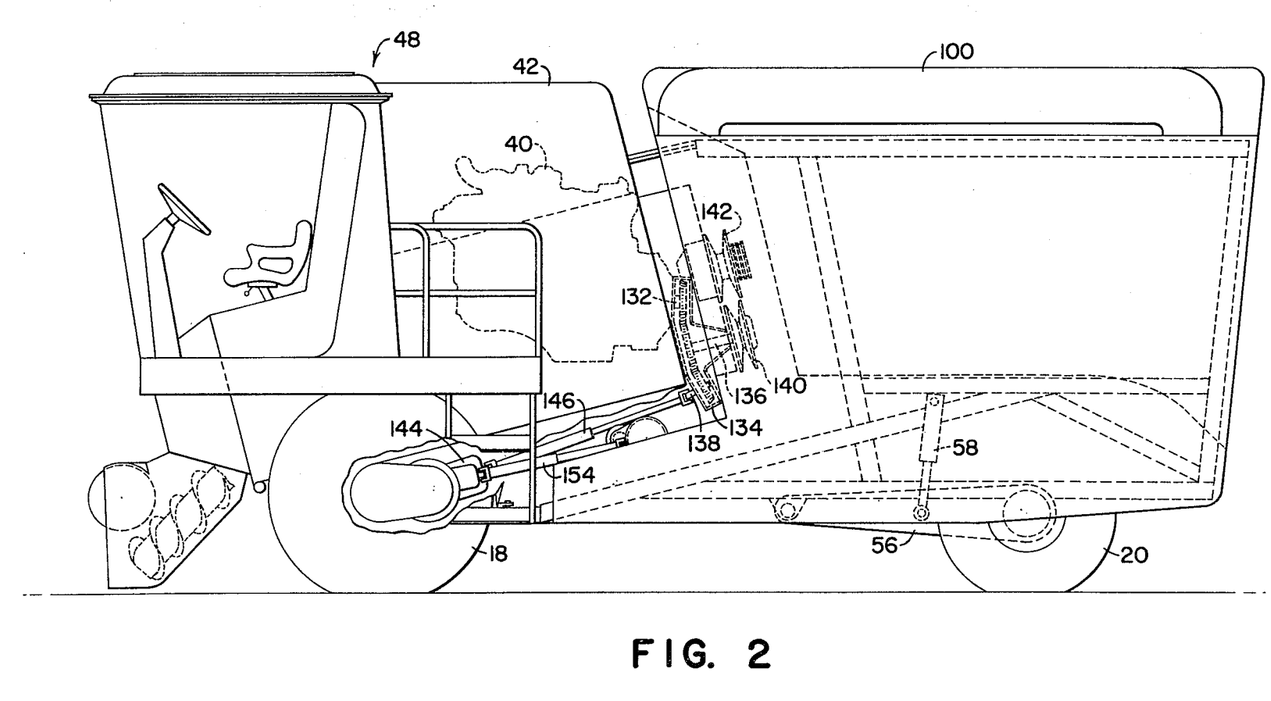
FIG. 2 is a view similar to FIG. 1 with portions of the combine broken away to show part of the drive system and with portions of the framing elements shown in dotted lines.

Unthreshed crop material is fed to the forward end of the separator 26 by an auger type feeder house indicated in its entirety by the numeral 28. A dual auger type feeder house is shown and described in greater detail in U.S. Pat. No. 4,087,953, also assigned to the assignee herein. As described in said patent, a harvesting header, which is only schematically shown in FIG. 1 and indicated generally by the numeral 30, is mounted on the forward end of the feeder house 28 and removes crop material from the field in the well known manner, the feeder house feeding crop material to the forward end of the rotary separator 26.

As shown in FIG. 5, the front frame structure 14 also includes a lower pivot support 32 which depends from the separator support 24, and attached to the lower pivot support is an axle support structure 34 which is connected to the axles for the front wheels 18 in a conventional manner. The front frame structure also includes an upper pivot support that is attached to the separator support 24 and is disposed above the rotary separator 26.

The front frame structure 14 also includes an engine supporting structure 38 that extends from the right side of the separator support and supports a conventional internal combustion engine 40 that is mounted on the right side of the front unit 10 in a fore and aft orientation. The engine 40 is mounted in an engine housing 42 having rotary screen air inlets 44 facing toward the front of the combine for cleaning the engine-cooling air.

At the left side of the front frame structure, there is provided an operator station support structure 46, which supports a conventional operator's station or cab 48 that is located at the left forward corner of the front unit over the left front wheel 18.

Figure 8:
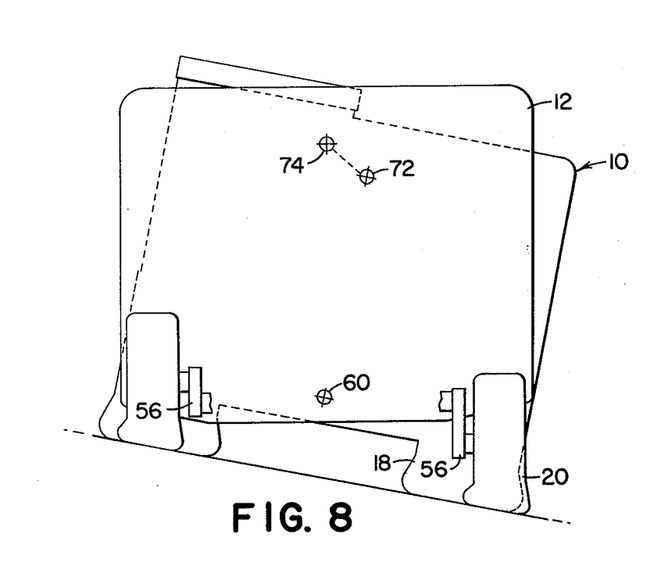
FIG. 8 is a somewhat schematic rear view of the combine operating on a side hill.

The rear frame structure 16 includes a pair of transversely spaced generally upright side frames 50 connected by a plurality of transverse frame members including a lower front transverse member 52 and an upper front transverse member 54. Pivotally connected to the lower portions of the respective side frames 50 are a pair of wheel support arms 56 that are swingable in a vertical arc about a transverse pivot axis 57. A hydraulic cylinder 58 interconnects each arm to the respective side frame for controlling the position of the arm and consequently the position of the rear wheel 20 mounted at the rear end of the arm relative to the rear frame structure 16. A self-levelling control system (not shown) is associated with each cylinder 58 and is operative to maintain the rear unit 62 in a generally level condition about a fore and aft axis, at least on moderate slopes. Such control systems are well known and a system of the above general type is utilized on the John Deere 6600 Sidehill Combines. As best seen in FIG. 8, when operating on a side hill, the wheel arm 56 on the downhill side is swung downwardly while the arm 56 on the uphill side moves upwardly, the system only being schematically shown in the drawings. Of course, the rear unit 12 could also be self-levelling on more severe slopes with a more complicated self-levelling system, such as the systems utilized on currently available hillside combines.

Figure 9:
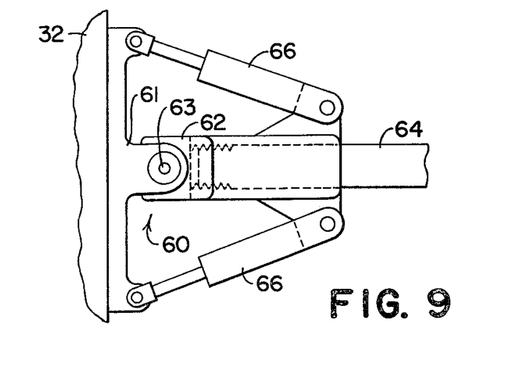
FIG. 9 is an enlarged plan view of the lower pivot structure.

The pivot or hinge 22 between the front and rear frame structures 14 and 16 includes a lower pivot 60 that comprises a clevis 61 attached to the support 32 and a tongue member 62 that is connected to the clevis 61 by a vertical pivot pin 63, so that the member 62 is free to rotate relative to the member 61 about a vertical axis and also able to flex to a limited degree about a transverse axis. As best seen in FIG. 9, the member 62 is provided with an internally threaded rearwardly open socket into which an externally threaded tongue 64 is threaded, the rearward end of the tongue 64 being connected to the transverse member 52 of the rear frame structure 16. The tongue 64 is not threaded all the way into the member 62, so that the tongue 64 is free to rotate relative to the member 62 about a fore and aft axis to a limited degree. A pair of steering cylinders 66 interconnect the rearward end of the member 62 to the front frame structure 16 on opposite sides of the pivot, so that extension of one cylinder 66 or the other causes the rear frame structure to swing relative to the front frame structure about the pivot pin 63. A steering system similar to that used on conventional articulated tractors can be used to control the steering cylinders 66, the combine being combined with a hydraulic pump (not shown) for supplying the necessary hydraulic power for the various hydraulically operated functions on the combine.

The pivot or hinge 22 also includes an upper pivot, indicated generally by the numeral 68. The upper pivot 68 comprises a generally fore and aft link 70 having its forward end connected to the upper pivot support structure 36 by a ball joint 72 and its rearward end connected to the rear frame structure transverse member 54 by means of a ball joint 74. The ball joint 72 is in general vertical alignment with the lower pivot pin 63, so that if the rear frame structure 16 oscillates relative to the front frame structure 14 about the fore and aft axis of the socket and tongue connection at the lower pivot, the rear ball joint 74 will swing laterally about the axis of the front ball joint 72 of the upper pivot. In the embodiment shown in FIGS. 5 and 6, such swinging motion will decrease the distance between the upper portions of the front and rear frame structures, causing a slight buckling or dropping of the central portion of the combine between the front and rear wheels about the transverse axis of the lower pivot 60.

Figure 7:
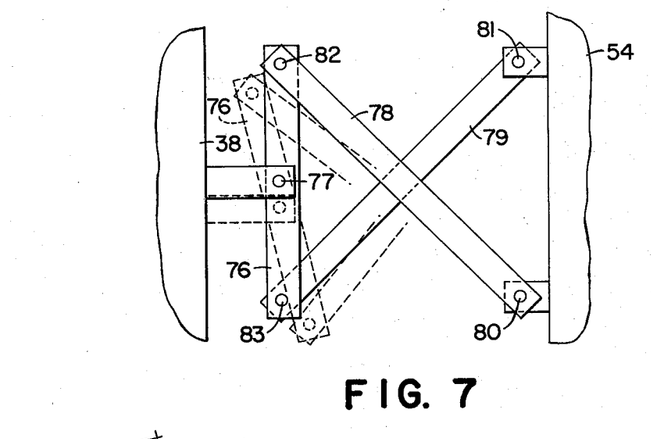
FIG. 7 is an enlarged plan view of an alternate embodiment of the upper pivot, with an alternate position of the linkage being shown in dotted lines.

An alternate embodiment for the upper pivot 68 is shown in FIG. 7, which eliminates the buckling effect during oscillation of the rear unit relative to the front unit. The alternate pivot includes a generally transverse lever arm 76 pivotally connected to the front frame structure by a vertical pivot 77 between the opposite ends of the lever are. A pair of crossed links 78 and 79 respectively have their rearward ends connected to spaced portions of the rear frame structure by vertical pivots 80 and 81 and have their forward ends respectively connected to the opposite ends of the arm 76 by vertical pivots 82 and 83. When the upper portion of the front frame structure shifts laterally relative to the upper portion of the rear frame structure, such as would occur during oscillation about the fore and aft axis of the lower pivot 60, the links 78 and 79 swing to their dotted line positions in FIG. 7, so that one end of the arm 76 swings forwardly while the opposite end swings rearwardly. However, the net effect of such swinging movement at the center of the arm 76 is zero movement in a fore and aft direction, so that the pivot 77 stays the same distance away from the rear frame structure. Since the pivot 77 is connected to the upper portion of the front frame structure, the compensating linkage shown in FIG. 7 maintains a constant spacing between the upper ends of the front and rear frame structures regardless of the oscillation of the rear unit relative to the front, thereby eliminating any buckling between the two frame structures.

Figures 3, 4:
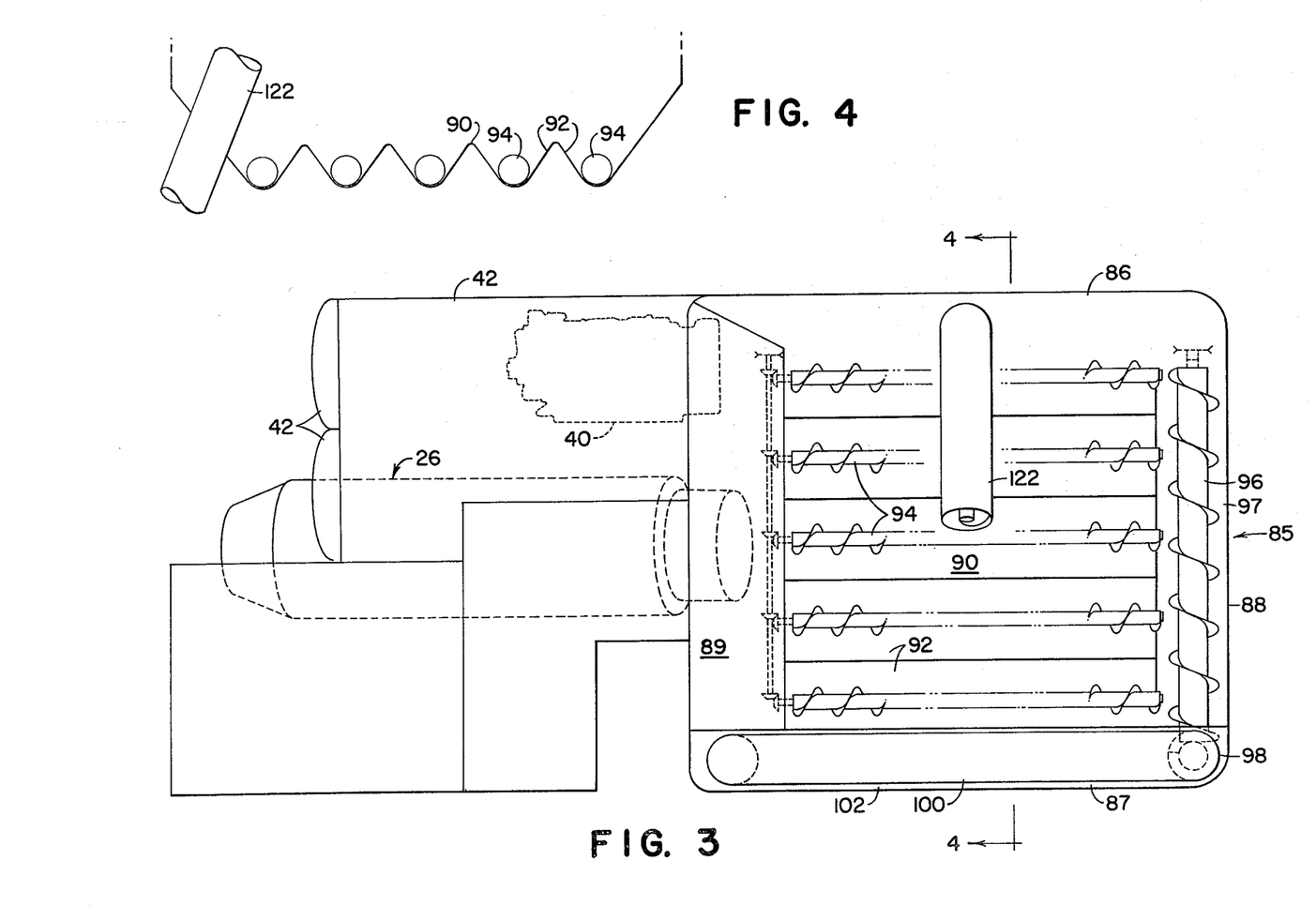
FIG. 3 is a plan view of the combine without the header and feeder house and schematically illustrating some of the components in hidden lines.
FIG. 4 is a section view of the grain tank as viewed along the line 4—4 of FIG. 3.

An enlarged grain tank 85 is mounted on the rear unit 12 and includes right and left side walls 86 and 87 respectively attached to the opposite side frames 50, a generally upright rear wall 88, and a front wall 89, the lower portion of which is recessed rearwardly to provide clearance for the rearward end of the separator and engine. The grain tank has a generally horizontal floor 90 that is provided with a plurality of parallel side-by-side troughs 92, as best seen in FIGS. 3 and 4. A fore and aft auger 94 is disposed in each trough and operates to move grain rearwardly along the floor to a transverse auger 96, that spans the width of the grain tank in a trough 97 at the rear edge of the grain tank. A vertical discharge auger 98 extends upwardly from the discharge end of the auger 96 and is fed thereby, the vertical auger 98 including a conventional auger tube and feeding a horizontal discharge auger 100. The discharge auger 100 is swingable about the axis of the vertical auger 98 from an inoperative position, as shown in the drawings, wherein it is disposed in a fore and aft recess 102 along the upper left side of the grain tank, and a discharge position wherein the outer free end of the auger is disposed outwardly or rearwardly of the combine for discharge of the grain in the grain tank into an attending vehicle in a well known manner.

Figure 10:
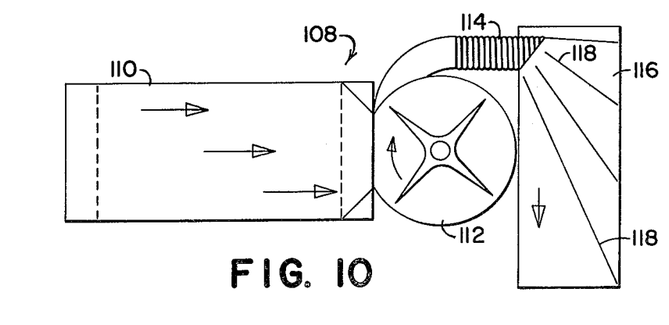
FIG. 10 is a schematic plan view of the mechanism for transferring crop material from the separator on the front unit to the cleaner on the rear unit.

Mounted on the rear frame structure 16 immediately below the floor of the grain tank is a cleaning mechanism 104. The cleaning mechanism is of generally conventional construction and includes a blower 106 and conventional chaffers and sieves 107. Grain and other material falling through the grates of the separator 26 are transferred to the cleaning mechanism 104 by a crop transfer mechanism, indicated in its entirety by the numeral 108. The crop transfer mechanism is somewhat schematically illustrated and is best shown in FIG. 10, the mechanism including a belt-like separator conveyor 110 disposed immediately beneath the separator grates and having a rearwardly moving upper run that conveys the grain falling through the separator grates into the housing of a rotary impeller 112. Both the conveyor 110 and the impeller 112 are mounted on the front frame structure and are driven in the direction of the arrows in FIG. 10. The impeller 112 has a tangential rearwardly extending discharge chute 114 that is flexible to a sufficient degree to accommodate the maximum degree of articulation between the front and rear units, the rearward end of the discharge chute 114 being connected to the rear frame structure. The impeller discharges grain from the rearward end of the chute 114 onto a transverse belt-type conveyor 116 on the rear frame structure, the conveyor 116 having a transversely moving upper run. Fanning out from the rearward end of the discharge chute and extending upwardly from and immediately above the upper run of the conveyor 116 are a plurality of deflector means 118 that move material rearwardly on the upper surface of the conveyor as the conveyor moves laterally so that a relatively even flow of material falls off the rearward edge of the conveyor onto the top of the cleaning mechanism.

As is well known, the air stream from the blower 106 blows through the material sifting down through the cleaning mechanism and carries chaff and the like out a discharge opening 119 at the rear of the combine, while the heavier cleaned grain falls through the cleaning mechanism and is conveyed to a clean grain collector 120, in the form of a transverse auger. The clean grain collecting auger 120 moves the cleaned grain laterally to a vertical grain tank loading auger 122 that extends upwardly and inwardly from the side of the combine and has its upper discharge end located centrally of the grain tank at the top edge thereof. Such fountain-type grain tank loading augers are also well known.

As is also known, unthreshed heads of grain frequently fall through the cleaning mechanism at the rearward end thereof, and such unthreshed heads or tailings are conventionally collected by a transverse tailings collector auger 124. Rather than convey the tailings all the way back to the front end of the threshing and separating mechanism, a small rethreshing cylinder 126 is coaxially disposed at one end of the auger 124. Such rethreshing cylinders in a tailings return system are broadly known, and the rethreshed tailings are collected and returned upwardly and forwardly by a tailings return conveyor 128, which feeds a transverse auger 130 that conveys the rethreshed tailings and drops them onto the top of the cleaning mechanism.

As previously described, the engine 40 is oriented in a fore and aft direction and has a rearwardly extending engine output shaft 132 that provides the input to a gearbox 134 mounted on the front frame structure at the rear end of the engine. The gear box has somewhat beveled gears, one of which drives an upwardly and rearwardly inclined output shaft 136 that is parallel to the axis of the rotary separator. The gearbox 134 has a lower output shaft 138 that is inclined downwardly and forwardly. A variable diameter V-belt sheave 140 is mounted on the output shaft 136 and drives a similar variable diameter sheave 142 on the rear end of the rotor shaft of the separator through a conventional V-belt (not shown) so that, although the engine output speed is relatively constant, the speed of the rotor can be varied.

The lower output shaft 138 is connected to the input of a gear box 144 on the rear side of the front axle through a drive shaft 146 that includes a pair of universal joints. The gear box has an output shaft 148 that is connectible to the header drive system, a second output shaft 149 that is operative to drive the feeder house components and other components such as the transfer mechanism and a third driveshaft that serves as an input to a transmission 150 that drives the front wheels of the combine. The gear box 144 is also drivingly connected to a rear gear box 152 on the rear frame structure by a rearwardly extending driveshaft 154 that is provided with front and rear universal joints and crosses the axis of articulation.

Figure 11:
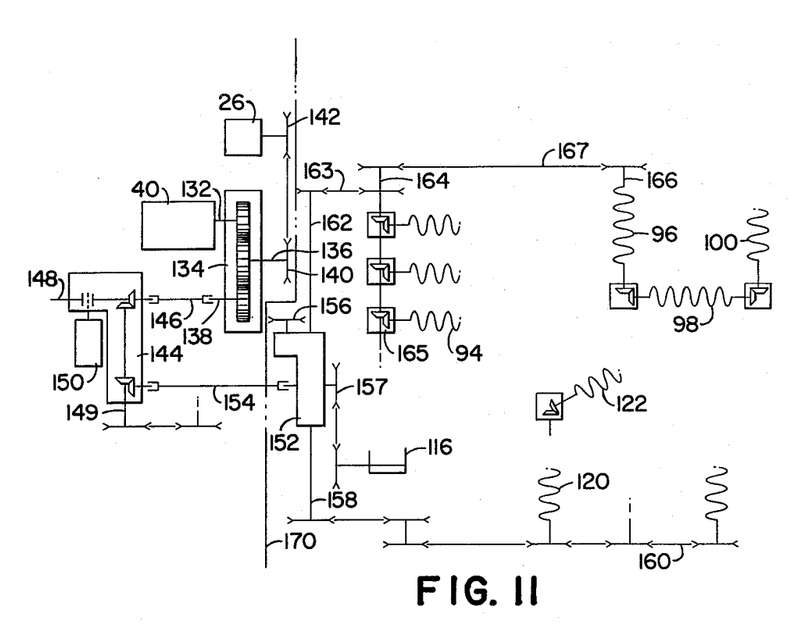
FIG. 11 is a schematic layout of the drives for the various combine components.

All the driven components on the rear unit are driven from the rear gear box 152, which includes an output shaft for the blower drive 156, an output shaft and belt drive 157 for the conveyor 116 and an output shaft 158 and associated belt drives for the clean grain collector auger and grain tank loading auger 122. The cleaner, tailings collector, rethresher, and conveyor are similarly driven by a series of belt drives 160 from the belt drive to the loading auger. The gear box 152 has a further output shaft 162 that is connected by a belt drive 163 to a transverse driveshaft 164 drivingly connected to the grain tank floor augers 94 through a series of bevel gears 165. The shaft 164 is connected in turn to a shaft 166 for the grain tank unloading system via a belt drive 167, the shaft 166 being connected to the shaft of the auger 96, which in turn is drivingly connected to the vertical auger 98, which then is connected to the discharge auger 100. The various drives are schematically illustrated in FIG. 11, wherein the dividing line 170 divides the front and rear units of the combine. As is apparent, only the drive shaft 154 goes across the axis of articulation.

In operation, the header 30 removes crop material from the field as the machine advances and delivers it to the forward end of the feeder house 28 which feeds the forward end of the rotary axial flow threshing and separating mechanism 26. The separated grain and other foreign material falls onto the conveyor 110, which moves the material rearwardly to the crop transfer impeller 112, which impells the crop material rearwardly across the axis of articulation onto the distributing conveyor 116, which dumps the material onto the top of the cleaning mechanism 104. The cleaned grain falling through the cleaning mechanism is collected by the clean grain collecting auger 120, which feeds the grain tank loading auger 122.

As is apparent, the grain tank 85 is much larger than the grain tank on a conventional machine and encompasses substantially the entire upper portion of the rear unit 12. For example, for the machine illustrated herein, the grain tank would have an approximate capacity of 360 bushels, which is approximately double the capacity of the grain tanks on most currently available machines, even machines that are at the top of the line in terms of capacity. Despite the large grain tank, the combine has a substantially lower profile than conventional machines. The wheels are located so that the center of gravity of the front unit is over the front axle, while the center of gravity of the fully loaded rear unit is located directly above the axis of the rear wheels. Since the center of gravity of the front and rear units is over the wheels, the hinge or pivot between the units does not have to carry a large load, and can be made of relatively light construction. When the grain tank is loaded, the front unit weighs approximately the same as the rear unit so that each of the four wheels carries about 25% of the total weight. Another feature of the articulated design resides in the fact that the front and rear units have separate stability characteristics, providing a more stable overall machine.

For greater traction, the rear wheels 20 could be driven by a conventional hydrostatic drive, such as the hydrostatic rear-wheel drives currently available for conventional machines. The articulated design provides quicker steering reaction and a lesser steering radius, so that the combine has superior handling characteristics, particularly in harvesting row crops.

The self-levelling feature for the rear unit of the combine increases the capacity of the cleaning mechanism when the machine is operating on uneven terrain. As is well known, the cleaning capacity rather than the separating capacity has been the limiting factor in some of the previous rotary axial flow machines. Since only the cleaning mechanism is slope-sensitive in such previous rotary combines, the elimination of the slope sensitivity for the cleaning unit means that the entire combine is no longer slope sensitive.

The self-levelling feature together with the low profile and low center of gravity of the loaded grain tank also provide a more stable combine. Further, the articulated design, with its more stable characteristics, permits location of components for volumetric and operating efficiency rather than for stability or weight distribution considerations.

As is apparent from FIG. 11, the illustrated arrangement of components provides the opportunity for a relatively simple drive system. The higher power consuming components are all on the front unit of the combine and the single driveshaft 154 crossing the axis of articulation transmits a relatively small portion of the total power put out by the engine 40, most of the power being consumed by the separator rotor, the propulsion drive, and the drive for the header. Thus, the overall design and arrangement of components of the illustrated combine provide a simple, highly efficient combine, with increased stability and capacity.

I claim:

1. An articulated combine comprising: front and rear frame structures; pivot means pivotally connecting the front and rear frame structures for articulation about a generally vertical axis and including a lower pivot element having a vertical pivot axis and connecting the bottom portions of the front and rear frame structures and an upper pivot element interconnecting the upper portions of the frame structures; front and rear pairs of ground-engaging wheels respectively supporting the front and rear frame structures; means operative between the front and rear frame structures for swinging one frame structure relative to the other to effect steering of the combine; a forwardly disposed harvesting means supported on the front frame structure and operative to remove crop material from the field; a separating means supported on the front frame structure and operative to receive crop material from the harvesting means and separate grain included in said crop material; a grain tank mounted on the rear frame structure and including discharge means for emptying the grain tank; crop handling means mounted on said structures for delivering grain from the separating means to the grain tank; an operator's station mounted on the front frame structure; an engine mounted on one of said frame structures; and drive means operatively connecting the engine to at least one pair of said wheels to propel the combine and to the harvesting means, separating means, and crop handling means for driving said means.

2. The invention defined in claim 1 wherein the engine is mounted on the front frame structure.

3. The invention defined in claim 2 wherein the crop handling means includes a grain cleaning means mounted on the rear frame structure, crop transfer means operative to move grain from the separating means to the cleaning means, and conveyor means operative to move clean grain from the cleaning means to the grain tank.

4. The invention defined in claim 3 wherein the separating means is of the axial flow type and is mounted centrally of the front frame structure with its axis disposed in a fore and aft direction.

5. The invention defined in claim 3 and including a tailing collector means operatively associated with the cleaning means for collecting the cleaner tailings, a re-threshing means mounted on the rear frame structure operative to receive and thresh the tailing from the collector means, and conveyor means on the rear frame structure operative to deliver the re-threshed tailings from the re-threshing means to the cleaning means.

6. The invention defined in claim 3 wherein the cleaning means is mounted on the rear frame structure below the grain tank.

7. An articulated combine comprising: front and rear frame structures; pivot means pivotally connecting the front and rear frame structures for articulation about a generally vertical axis and oscillation relative to one another about a fore and aft axis; front and rear pairs of ground-engaging wheels respectively supporting the front and rear frame structures; means operative between the front and rear frame structures for swinging one frame structure relative to the other to effect steering of the combine; a forwardly disposed harvesting means supported on the front frame structure and operative to remove crop material from the field; a separating means supported on the front frame structure and operative to receive crop material from the harvesting means and separate grain included in said crop material; a grain tank mounted on the rear frame structure and including discharge means for emptying the grain tank; crop handling means mounted on said structures for delivering grain from the separating means to the grain tank; an operator's station mounted on the front frame structure; an engine mounted on one of said frame structures; and drive means operatively connecting the engine to at least one pair of said wheels to propel the combine and to the harvesting means, separating means, and crop handling means for driving said means.

8. The invention defined in claim 7 wherein the pivot means includes a lower pivot element connecting the front and rear structures for relative pivoting movement about a vertical axis and a fore and aft axis and an upper pivot element including linkage means pivotally connected to upper portions of both the front and rear frame structures, the pivot connection to one of the structures being in general vertical alignment with the vertical pivot axis of the lower element while the pivot connection of the linkage means to the other structure accomodates the oscillation of the frame structures relative to one another about the fore and aft axis.

9. The invention defined in claim 8 wherein the rear frame structure includes self-leveling means operative between the rear wheels and the remainder of the structure for maintaining the rear frame structure in a generally constant attitude about a fore and aft axis.

10. The invention defined in claim 9 and including grain cleaning means mounted on the rear frame structure generally below the grain tank.

11. The invention defined in claim 7 wherein the separator means is of the rotary axial flow type having a generally fore and aft axis centrally disposed on the front frame structure and the engine is mounted on the front frame structure and has an output shaft extending in a generally fore and aft direction on one side of the separator, the operator's station being mounted on the front frame structure on the opposite side of the separator.

12. The invention defined in claim 11 wherein the drive means includes a gear box connected to and driven by the engine output shaft and having a first output shaft parallel to the separator axis and a second output shaft and means connecting the first output shaft to the separator rotor and the second output shaft to the front wheels.

13. An articulated combine comprising: front and rear frame structures; pivot means pivotally connecting the front and rear frame structures for articulation about a generally vertical axis and including a lower pivot element having a vertical pivot axis and connecting the bottom portions of the front and rear frame structures and an upper pivot element interconnecting the upper portions of the frame structures, the upper element including at least one vertical pivot axis in general vertical alignment with the lower pivot axis and the lower pivot element also including a generally fore and aft pivot axis to permit oscillation of the front frame structure relative to the rear frame structure about a generally fore and aft axis, the upper pivot element including linkage means pivotally connected to upper portions of both the front and rear frame structures, the pivot connection to one of the structures being in general vertical alignment with the vertical pivot axis of the lower element while the pivot connection of the linkage means to the other structure accommodates the oscillation of the frame structure accommodates the oscillation of the frame structures relative to one another about the fore and aft axis of the of the lower pivot element; front and rear pairs of ground-engaging wheels respectively supporting the front and rear frame structures; means operative between the front and rear frame structures for swinging one frame structure relative to the other to effect steering of the combine; a forwardly disposed harvesting means supported on the front frame structure and operative to remove crop material from the field; a separating means supported on the front frame structure and operative to receive crop material from the harvesting means and separate grain included in said crop materials; a grain tank mounted on the rear frame structure and including discharge means for emptying the grain tank; crop handling means mounted on at least one of said structures for delivering grain from the separating means to the grain tank; an operator's station mounted on one of said frame structures; an engine mounted on one of said frame structures; and drive means operatively connecting the engine to at least one pair of said wheels to propel the combine and to the harvesting means, separating means, and crop handling means for driving for said means.

14. The invention defined in claim 13 wherein the rear frame structure includes self-leveling means operative between the rear wheels and the remainder of the rear frame structure for maintaining the rear frame structure in a generally constant attitude about a fore and aft axis.

15. The invention defined in claim 13 wherein the linkage means includes a generally transverse link pivotally connected between its opposite ends to one of the frame structures and a pair of crossed links respectively having one end pivotally connected to the opposite ends of the transverse link and respectively having their other ends pivotally connected to the other frame structure.

16. The invention defined in claim 13 wherein the separator means comprises an axial flow rotary separator having a generally fore and aft axis and the engine and operator's station are respectively mounted on the front frame structure on opposite sides of the separator means.

17. An articulated combine comprising: front and rear frame structures; pivot means pivotally connecting the front and rear frame structures for articulation about a generally vertical axis; means operative between the front and rear frame structures for swinging one frame structure relative to the other to effect steering of the combine; front and rear pairs of ground-engaging wheels respectively supporting the front and rear frame structures; a forwardly disposed harvesting means supported on the front frame structure and operative to remove crop material from the field; a separating means mounted on the front frame structure and operative to receive crop material from the harvesting means and separate grain included in said crop material; an operator's station mounted on the front frame structure, a grain tank mounted on the rear frame structure and including discharge means for emptying the grain tank; a grain cleaning mechanism mounted on the rear frame structure generally below the grain tank; crop transfer means operative to move grain from the separating mechanism to the cleaning means; conveyor means operative to move cleaned grain from the cleaning means to the grain tank; an engine mounted on the front frame structure; and drive means operatively connecting the engine to the front wheels to propel the combine and to the harvesting means, separating means, grain cleaning means, crop transfer means, conveyor means and discharge means for driving said means.

18. The invention defined in claim 17 wherein the separator means is of the axial flow rotary type and includes a generally fore and aft rotor and the engine includes a generally fore and aft output shaft and is disposed on the opposite side of the separator means from the operator's station, the drive means including a gear box at the rearward end of the engine and having a first output shaft parallel to the rotor axis, a second output shaft, said drive means including means drivingly connecting the first output shaft to the rotor and the second output shaft to the front drive wheels.

19. A self-propelled combine harvester, comprising: a forward unit including a crop separator means, a means for gathering crop material from a field and transferring it to the separator means and at least two wheels spaced apart for supporting the unit above the ground; a rear unit including means for receiving at least a portion of the crop material and at least two wheels spaced apart for supporting the unit above the ground; means for transferring crop material between the forward and rear portions; a compound hinge connected between the forward and rear units for permitting relative movement between said units and including spaced apart upper and lower portions, the lower hinge portion including a pivot having a generally vertical axis providing for relative azimuthal pivoting movement between the forward and rear units; and means for controlling said relative movement between the units.

20. The invention defined in claim 19 wherein the upper hinge portion includes linkage means having a forward end pivotally connected to the forward unit and a rear end pivotally connected to the rear unit for permitting relative translatory and azimuthal motion between said forward and rear units.

21. The invention defined in claim 20 wherein the linkage means comprises a single link and its respective forward and rear ends each include a single pivot point.

22. The invention defined in claim 20 wherein the linkage means comprises a pair of intersecting links, each link having opposite ends, and a rocker arm pivotally connected to one of the units, and the opposite ends of each link are pivotally connected at spaced apart points on the rocker arm and on the other unit respectively.

23. The invention defined in claim 19 wherein the lower hinge portion further includes an oscillatory pivot connection having a generally fore-and-aft axis for permitting relative oscillation about said pivot axis between the forward and rear units.

24. An articulated combine comprising: a front frame structure including a pair of transversely spaced ground-engaging wheels; a rear frame structure including a pair of transversely spaced ground-engaging wheels; vertical axis pivot means pivotally connecting the front and rear frame structures for articulation about a generally vertical axis; fore and aft axis pivot means pivotally connecting the front and rear frame structures for oscillation of one frame structure relative to the other about a fore and aft axis; control means operative between the front and rear frame structures for swinging one frame structure relative to the other to effect steering of the combine; a forwardly disposed harvesting means at least partially supported on a forward portion of the front frame structure and operative to remove crop material from a field as the combine advances; a separating means at least partially supported on the front frame structure in crop receiving relationship with the harvesting means for receiving crop material therefrom, said separating means being operative to separate grain from the crop material removed from the field; a grain tank mounted on the rear frame structure and including discharge means for emptying the grain tank; a grain cleaning means mounted on one of said frame structures in crop receiving relationship with the separating means and operative to clean the grain separated by the separating means; enclosed conveyor means mounted on the front frame structures for conveying crop material across the axis of articulation to the rear frame structure; an operator's station mounted on a forward portion of the front frame structure generally above the level of the harvesting means; an engine mounted on the front frame structure; and drive means operatively connecting the engine to at least the front pair of wheel to propel the combine and also operatively connecting the engine to the harvesting means, the separating means, the cleaning means, and the conveyor means for driving said components.

25. An articulated combine comprising: front and rear frame structures; pivot means pivotally connecting the front and rear frame structures for articulation about a generally vertical axis; front and rear pairs of ground-engaging wheels respectively supporting the front and rear frame structures; means operative between the front and rear frame structures for swinging one frame structure relative to the other to effect steering of the combine; a forwardly disposed harvesting means supported on the front frame structure and operative to remove crop material from the field; a separating means supported on the front frame structure and operative to receive crop material from the harvesting means and separate grain included in said crop material; a grain tank mounted on the rear frame structure and including discharge means for emptying the grain tank, opposite generally upright sidewalls at opposite sides of the combine, a rear wall at the rear end of the combine, and a front wall extending between the opposite side walls proximate and adjacent to the rearward ends of the separator means, the cleaner means being mounted on the rear frame structure below the grain tank and at least partially between the rear wheels; crop handling means mounted on said structures for delivering grain from the separator means to the cleaner means; an operator station mounted on the front frame structure; an engine mounted on one of said frame structures; and drive means operatively connecting the engine to at least one pair of said wheels to propel the combine and to the harvesting means, separating means, cleaning means, and crop handling means for driving said means.

* * * * *